(12) United States Patent
Hirooka

(10) Patent No.: US 7,717,011 B2
(45) Date of Patent: May 18, 2010

(54) FIXING DEVICE FOR STEERING DEVICE

(75) Inventor: Kouji Hirooka, Gunma-ken (JP)

(73) Assignee: Yamada Manufacturing Co., Ltd., Kiryu-shi, Gunma-Ken (JP)

( * ) Notice: Subject to any disclaimer, the term of this patent is extended or adjusted under 35 U.S.C. 154(b) by 1098 days.

(21) Appl. No.: 11/376,311

(22) Filed: Mar. 16, 2006

(65) Prior Publication Data
US 2006/0225530 A1    Oct. 12, 2006

(30) Foreign Application Priority Data
Mar. 18, 2005    (JP) .............................. 2005-080751

(51) Int. Cl.
*B62D 1/18* (2006.01)
*B62D 1/00* (2006.01)

(52) U.S. Cl. ........................ 74/493; 280/777
(58) Field of Classification Search ............ 74/492.493; 280/775, 777
See application file for complete search history.

(56) References Cited

U.S. PATENT DOCUMENTS 3,238,797 A * 3/1966 Coughren ...................... 74/55
5,213,004 A * 5/1993 Hoblingre .................... 74/493
6,860,669 B2 * 3/2005 Laisement et al. ....... 403/109.1
2002/0023515 A1 * 2/2002 Kuroumaru et al. ........... 74/493
2004/0134302 A1 * 7/2004 Ko et al. ....................... 74/493

FOREIGN PATENT DOCUMENTS

JP    2002-59851    2/2006

* cited by examiner

*Primary Examiner*—David M. Fenstermacher
*Assistant Examiner*—Justin Krause
(74) *Attorney, Agent, or Firm*—McGinn IP Law Group, PLLC

(57) ABSTRACT

To provide a fixing device for a steering device capable of tilt adjustment and having a very simple cam structure.

The fixing device includes a fixed bracket; a movable bracket; a lock bolt that passes through the fixed bracket and the movable bracket; a main drive cam, through which the lock bolt passes, and that is fitted to rotate freely; and a driven cam, through which the lock bolt passes, and that is fitted unrotatably. Cam operation parts are formed on the main drive cam and the driven cam respectively. Cam operation parts on both sides are always in contact with the other side while the main drive cam and the driven cam separate and come close in the axial direction, and the diameter of the driven cam is larger than the diameter of the main drive cam.

9 Claims, 13 Drawing Sheets

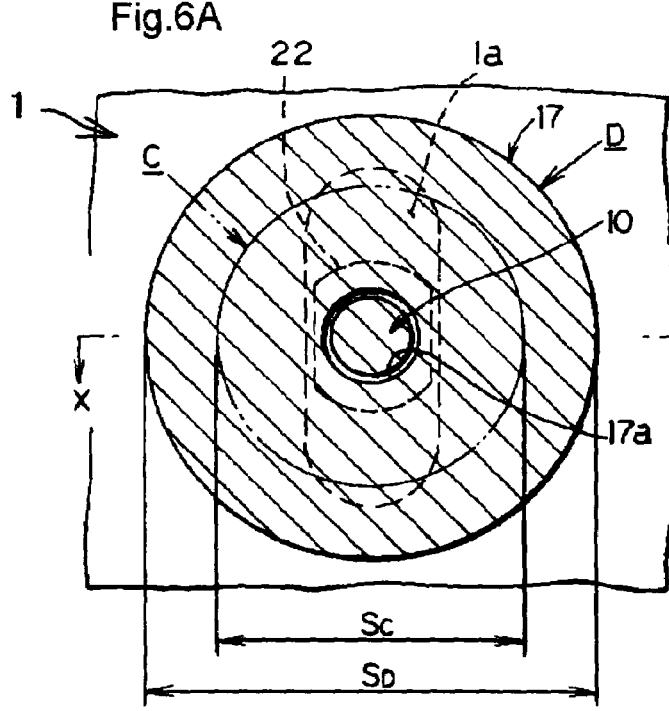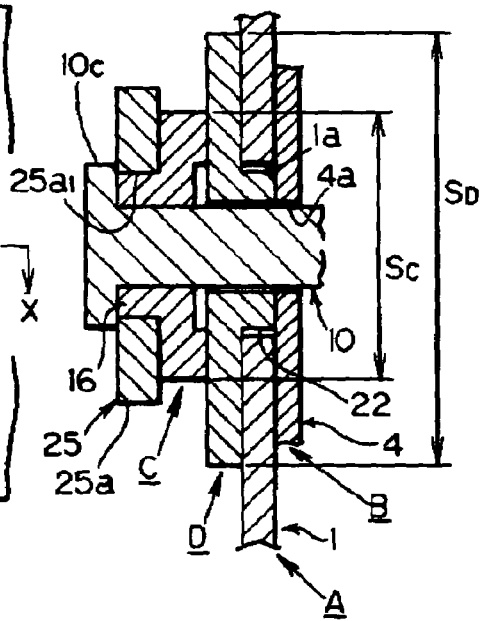

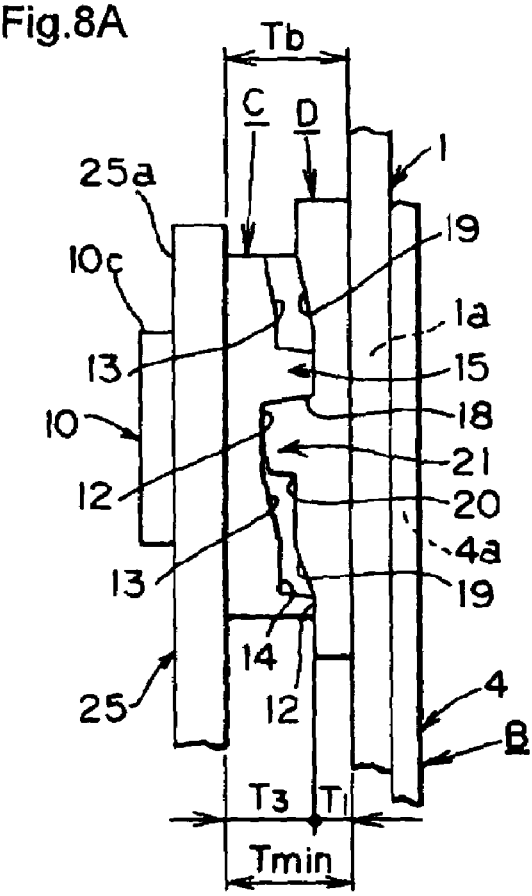
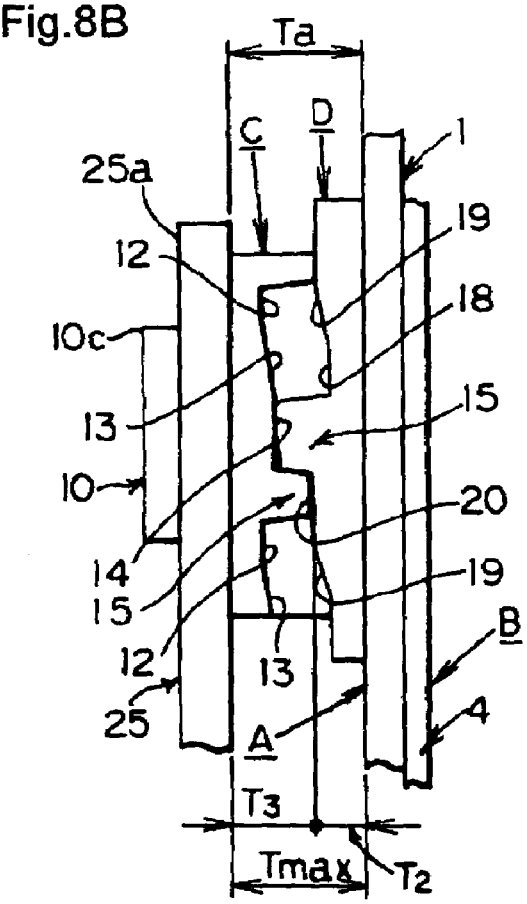

Fig.9A  Fig.9B  Fig.9C  Fig.9D
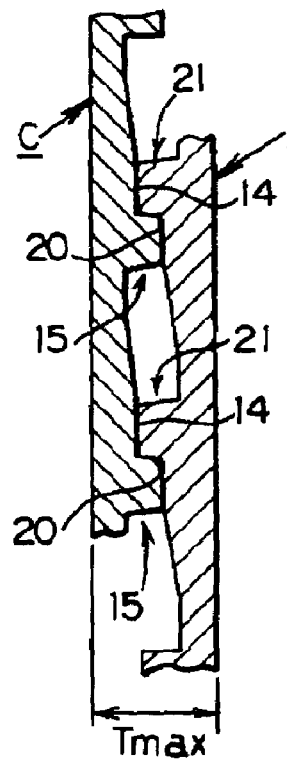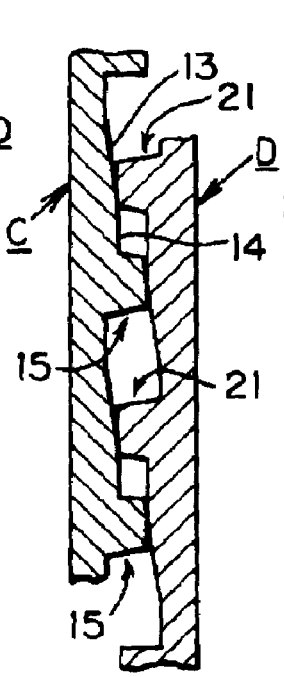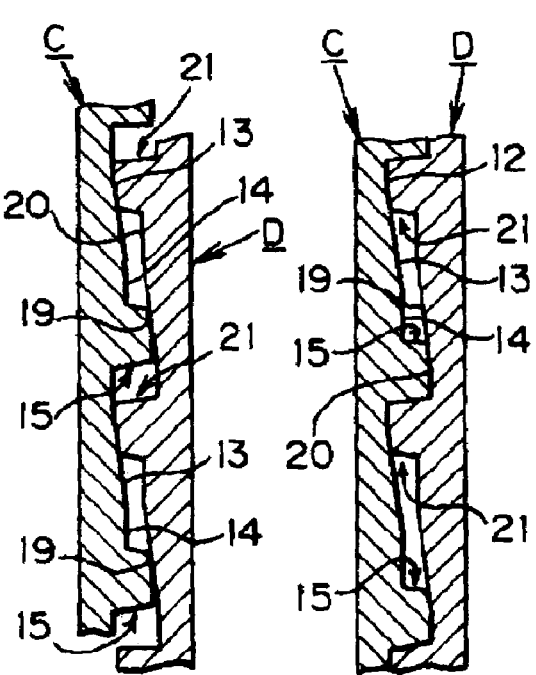

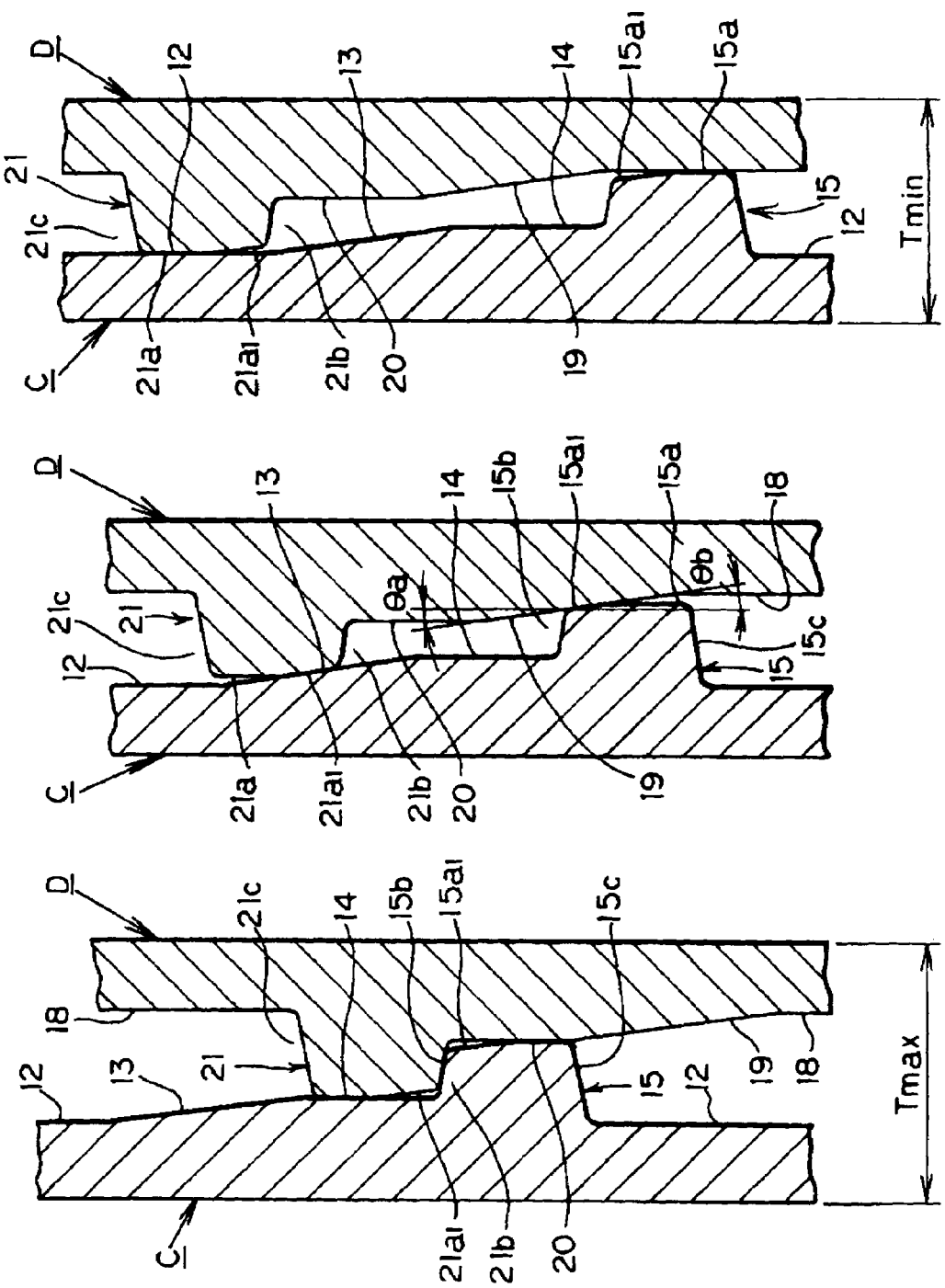

FIXING DEVICE FOR STEERING DEVICE

BACKGROUND OF THE INVENTION

1. Field of the Invention

The present invention relates to a fixing device for a steering device capable of tilt adjustment and having a very simple cam structure.

2. Description of the Related Art

Among tilt telescopic steering devices in which the height of a steering wheel and the orientation of the axis can be changed as appropriate to the body build and driving attitude of the driver, steering devices provided with a tilt adjustment mechanism whose structure includes an operation lever fitted to a lock bolt that passes through side plates of a fixed bracket installed on the car body and side plates of a movable bracket in which the steering column is installed, and by rotating the operation lever the side plates of the fixed bracket and movable bracket press against each other to lock the tilt are known.

Among this type of device are devices that include two cam members: one cam member fitted to the fixed bracket side, and the other cam member fitted to the operation lever for tilt adjustment, such as Japanese Patent Application Laid-open No. 2002-59851. This has a structure in which as a result of rotation of the operation lever, the cam surface of one cam member acts on the cam follower surface of the other cam member, so that the other cam member presses against the side part of the fixed bracket and the fixed bracket fixes the movable bracket. The cam member fitted to the operation lever is screwed to the threaded part of the tilt bolt. When the operation lever is rotated one cam member rotates, and acts on the cam follower surface of the other cam member fixed to the fixed bracket side part, so that the movable bracket side part presses against the fixed bracket side part.

This conventional cam configuration is shown in more detail in FIGS. 13A through 13C. The configuration includes a main drive cam 50 having a cam follower surface 51 (plateau 51a, slanting part 51b, valley 51c) and a driven cam 60 having a plurality of projections 61 that move up and down along the cam follower surface 51. The main drive cam 50 and driven cam 60 are fitted together. When the main drive cam 50 rotates relative to the driven cam 60, the locked state is when the projections 61 of the driven cam 60 rise onto the plateau 51a of the cam follower surface 51 of the main drive cam 50, and the released state is when the projections 61 of the driven cam 60 move from the plateau 51a of the cam follower surface 51 to the valleys 51c.

SUMMARY OF THE INVENTION

In the conventional type of cam mechanism such as in Japanese Patent Application Laid-open No. 2002-59851 as seen in FIG. 13, when operating the tilt and telescope by releasing or locking the operation lever the cam projection 61 rises and falls along the plateau 51a, slanting part 51b, and valley 51c of the cam follower surface 51. This results in wear of the cam follower surface 51 caused by contact friction at the cam follower surface 51 and the frequent use of the lever. Therefore the durability of the tilt telescope steering device is damaged. Also, as a result of the wear of the cam follower surface 51, the surface becomes rough, which causes the problem of poor feeling when operating (the load when operating the lever becomes heavier). Therefore to prevent wear of the cam surface, increasing the number of cam surfaces and projections to reduce the axial load applied to a single cam surface can be considered. However, there is a limit taking the size of the cam into consideration, and with the present size of cams increasing the number of cam surfaces is difficult. It is an object of the present invention to solve the above problem points.

Therefore, as a result of dedication and research to solve the above problem, the above problem is solved in the invention according to claim 1 with a fixing device for a steering device including a fixed bracket; a movable bracket; a lock bolt that passes through the fixed bracket and the movable bracket; a main drive cam, through which the lock bolt passes, and that is fitted to the lock bolt to rotate freely; and a driven cam, through which the lock bolt passes, and that is fitted to the fixed bracket unrotatably, wherein cam operation parts are formed on the main drive cam and the driven cam respectively, the cam operation parts on both sides are always in contact with the other side while the main drive cam and the driven cam separate and come close in the axial direction, and the diameter of the driven cam is larger than the diameter of the main drive cam.

Next, the invention according to claim 2 solves the problem with a fixing device for a steering device that includes a fixed bracket having a fixed side part; a movable bracket having a movable side part; a lock bolt that passes through the fixed side part and the movable side part; a main drive cam through which the lock bolt passes; a driven cam, through which the lock bolt passes, and that is fitted to the fixed bracket unrotatably; and an operation lever that rotates the main drive cam, wherein cam operation parts having cam projections are formed on the main drive cam and the driven cam respectively, the main drive cam and the driven cam separate and come close in the axial direction according to the state of rotation of the main drive cam while contact is maintained mutually between the cam projections and their corresponding cam operation parts, and the diameter of the driven cam is larger than the diameter of the main drive cam.

Next, the invention according to claim 3 solves the problem in configurations described above, wherein the cam operation parts of the main drive cam and the driven cam have a low surface, a slanting surface, and a high surface, as well as the projection. Also, the invention according to claim 4 solves the problem with a fixing device for a steering device wherein a guide surface that slopes towards the high surface side is formed on the top surface of the cam projection. Furthermore, the invention according to claim 5 solves the problem with a fixing device for a steering device with the above configuration wherein the sloping surface of the guide surface has the same slope as the slanting surface.

In the invention according to claim 1, the axial force applied to the cam operation parts of the main drive cam and the driven cam is distributed among each contact surface. Therefore the axial force applied to a single cam operation part is small, so it is possible to prevent damage to the cam surfaces, and the durability of the tilt telescopic steering device can be increased. The diameter of the driven cam is formed larger than the diameter of the main drive cam. The driven cam is fitted to the fixed side part of the fixed bracket, so the contact area of the driven cam and the fixed side part is larger. Therefore the force for fastening to the fixed bracket can be increased, and stable fastening of the driven cam can be maintained. Also, by increasing the diameter of the driven cam, the stiffness of the steering column can be increased.

Furthermore, according to the invention of claim 2, the tightening movement by the main drive cam and the driven cam can be made more accurate and certain. The diameter of the main drive cam is smaller than the driven cam, so compared with the structure where the diameter is the same as that of the driven cam the lever operation load can be made smaller, and good operability can be achieved. The other effects are approximately the same as those of claim 1. Also, according to the invention of claim 3, the mutual rotation movement of the cams can be smooth. Next, according to the invention of claim 4, the movement of the cam projections can be made smoother, and according to the invention of claim 5 sufficient contact area between cam projections and the mating side can be secured.

BRIEF DESCRIPTION OF THE DRAWINGS

FIG. 6A is a side view partially sectioned showing the structure of the main drive cam and driven cam fitted to the fixed side part of the fixed bracket, 6B is the section X-X in the direction of the arrows of 6A;

FIG. 8A is a side view of the main drive cam and the driven cam in the close state, 8B is a side view of the main drive cam and the driven cam in the separated state;

FIG. 9A shows the state of the cam projections when the main drive cam and driven cam are in the separated state, 9B shows the state when the cam projections are positioned between the high surface and the slanting surface, 9C shows the state when the cam projections are positioned on the slanted surfaces, 9D shows the state of the cam projections when the main drive cam and driven cam are in the close state;

FIG. 10A shows an enlarged view of the cam projections when the main drive cam and the driven cam are in the separated state, 10B shows an enlarged view of the guide surface of the projection in surface contact with the slanting surface, 10C shows an enlarged view of the cam projections when the main drive cam and the driven cam are in the close state;

DESCRIPTION OF THE PREFERRED EMBODIMENTS

Figure 1A:
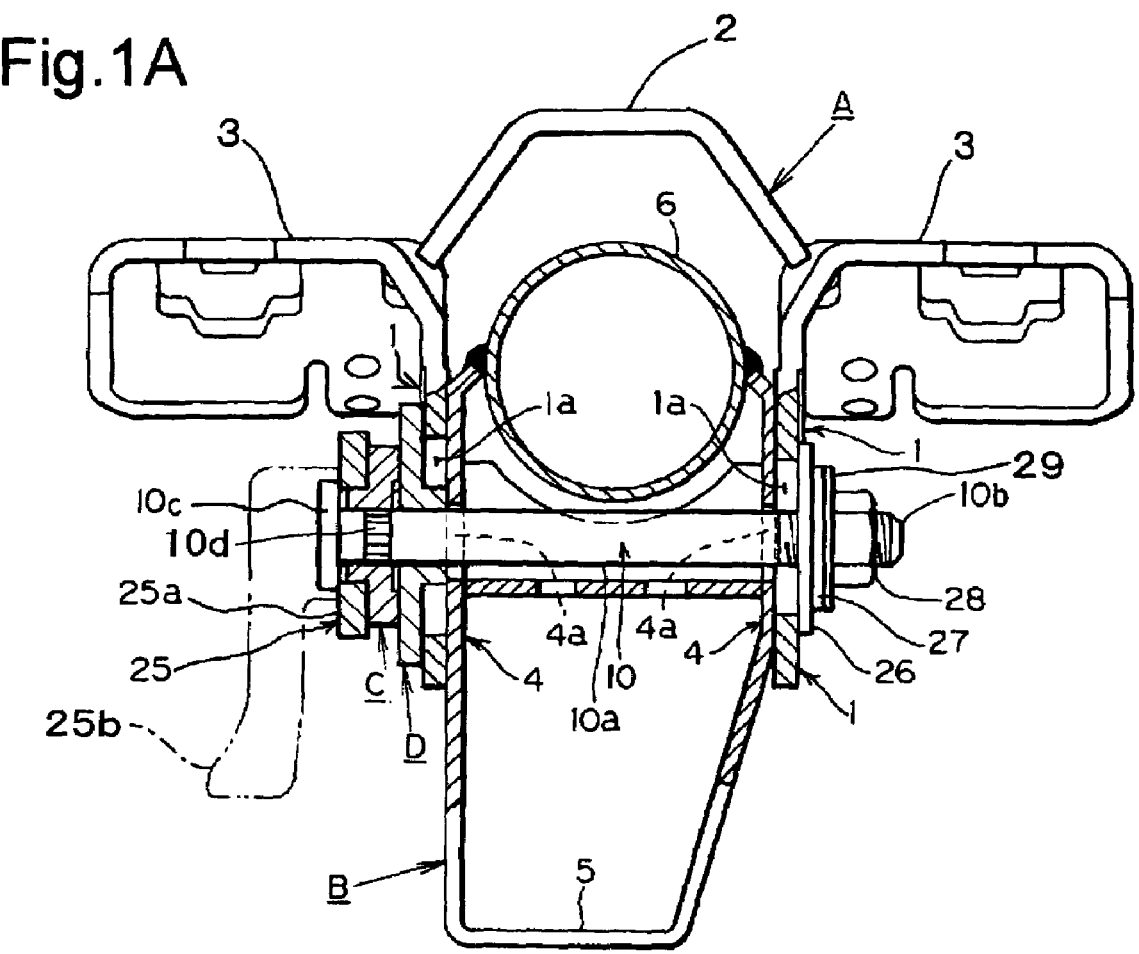
FIG. 1A is front view partially sectioned of the present invention, 1B is an expanded view of an important part of 1A.
Figure 1B:
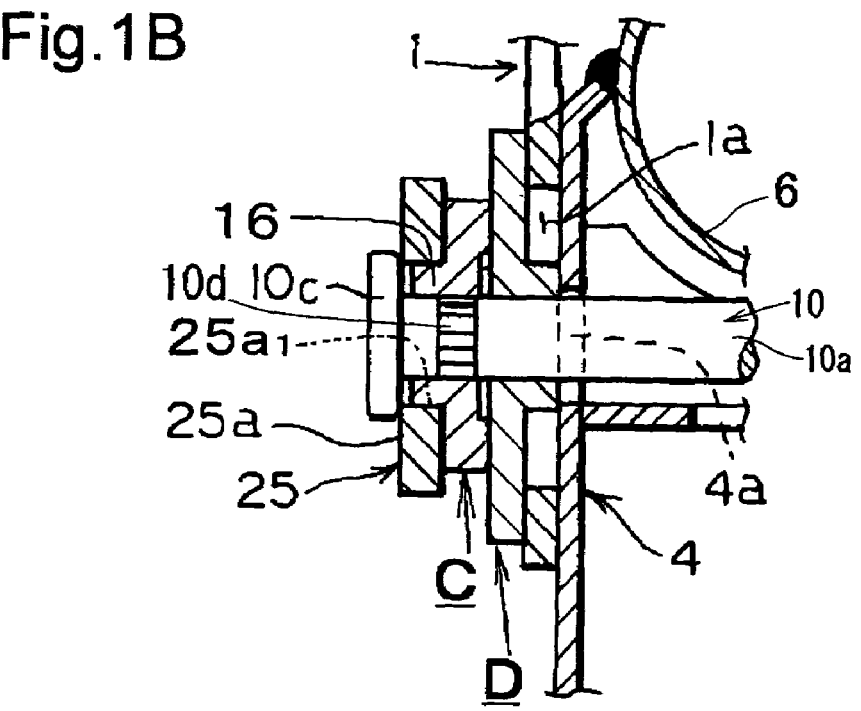
Figure 11:
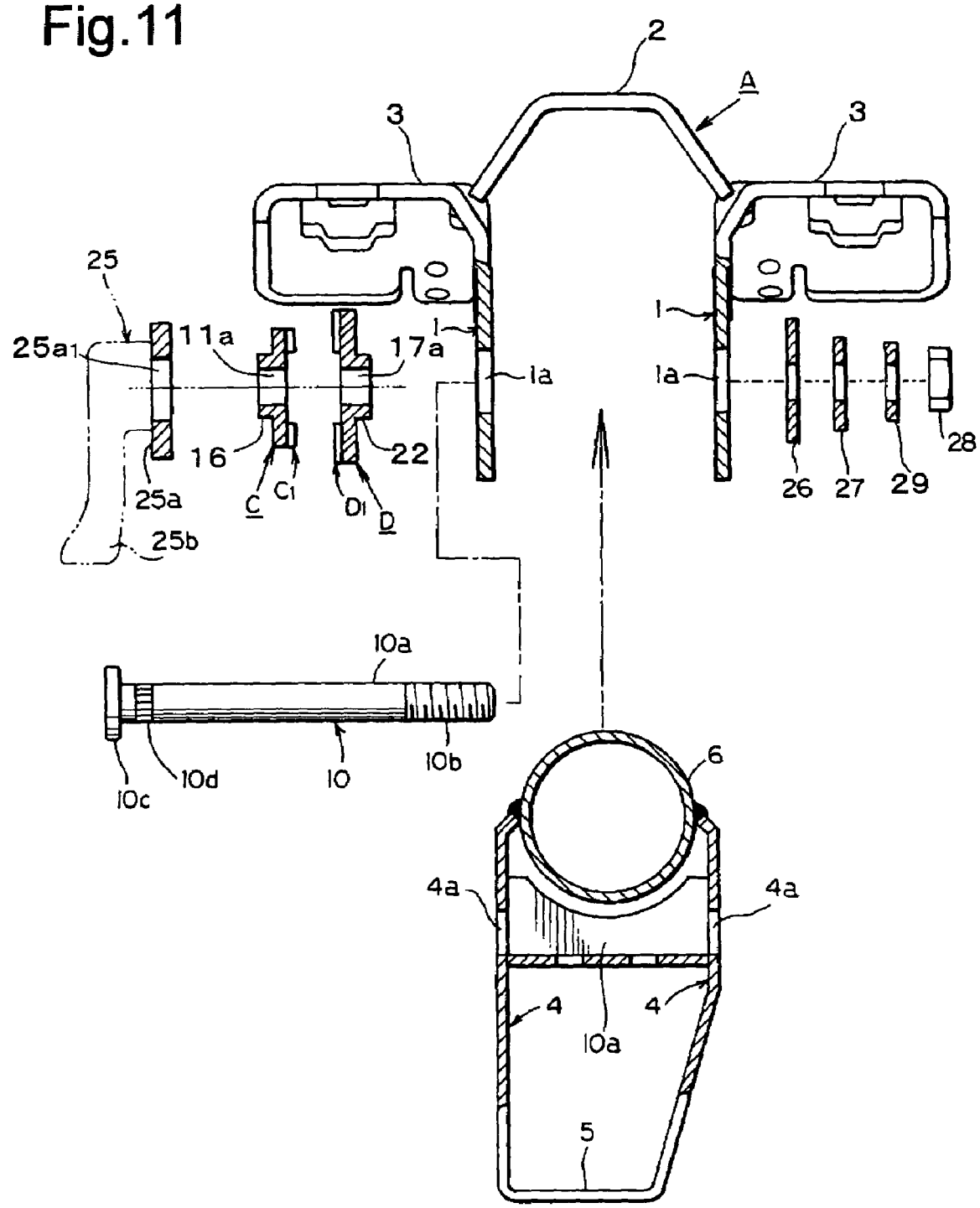
FIG. 11 is an exploded view of the main components of the present invention.

The following is an explanation of the preferred embodiments based upon the drawings. As shown in FIGS. 1 and 11 and others, the present invention includes mainly a fixed bracket A, a movable bracket B, a lock bolt 10, an operation lever 25, a main drive cam C, and a driven cam D. As shown in FIG. 11, the fixed bracket A is formed mainly from fixed side parts 1, 1, a connection part 2, and installation parts 3, 3. The two fixed side parts 1, 1 are substantially flat plate parts parallel and in confrontation. Tilt adjustment elongated holes 1a, 1a are formed in the two fixed side parts 1, 1 in an approximately vertical direction, through which a lock bolt 10 that is described later passes.

The two fixed side parts 1, 1 are connected at the top to a connecting part 2 by welding means or similar. The connecting part 2 is formed into an approximately trapezoidal gate shape, or arch shape when viewed from the front. Also, the horizontally shaped installation parts 3, 3 are formed at the top of the two fixed side parts 1, 1 facing outwards. The fixed bracket A is fixed to a frame member of the front of an automobile or other driven vehicle via the installation parts 3, 3.

The movable bracket B is formed to include mainly movable side parts 4, 4, and a bottom part 5, as shown in FIG. 11. The movable side parts are arranged in parallel. The movable side parts 4, 4 are arranged between the fixed side parts 1, 1 of the fixed bracket A. Therefore the distance between the two movable brackets 4, 4 is set slightly smaller than the interval between the fixed side parts 1, 1. Tilt adjustment through holes 4a, 4a are formed in the movable side parts 4, 4. The fixed side parts 1, 1 of the fixed bracket A and the movable side parts 4, 4 of the movable bracket B are structured to that the lock bolt 10 passes through them.

A steering column 6 is fixed to the top of the two movable side parts 4, 4 of the movable bracket B, as shown in FIG. 11. The steering column 6 is fixed to the two movable side parts 4, 4 by welding means or similar. A steering shaft 7 is inserted in the steering column 6 so that it can freely rotate, and a steering wheel 8 is provided at the end of the steering shaft 7.

Figure 2:
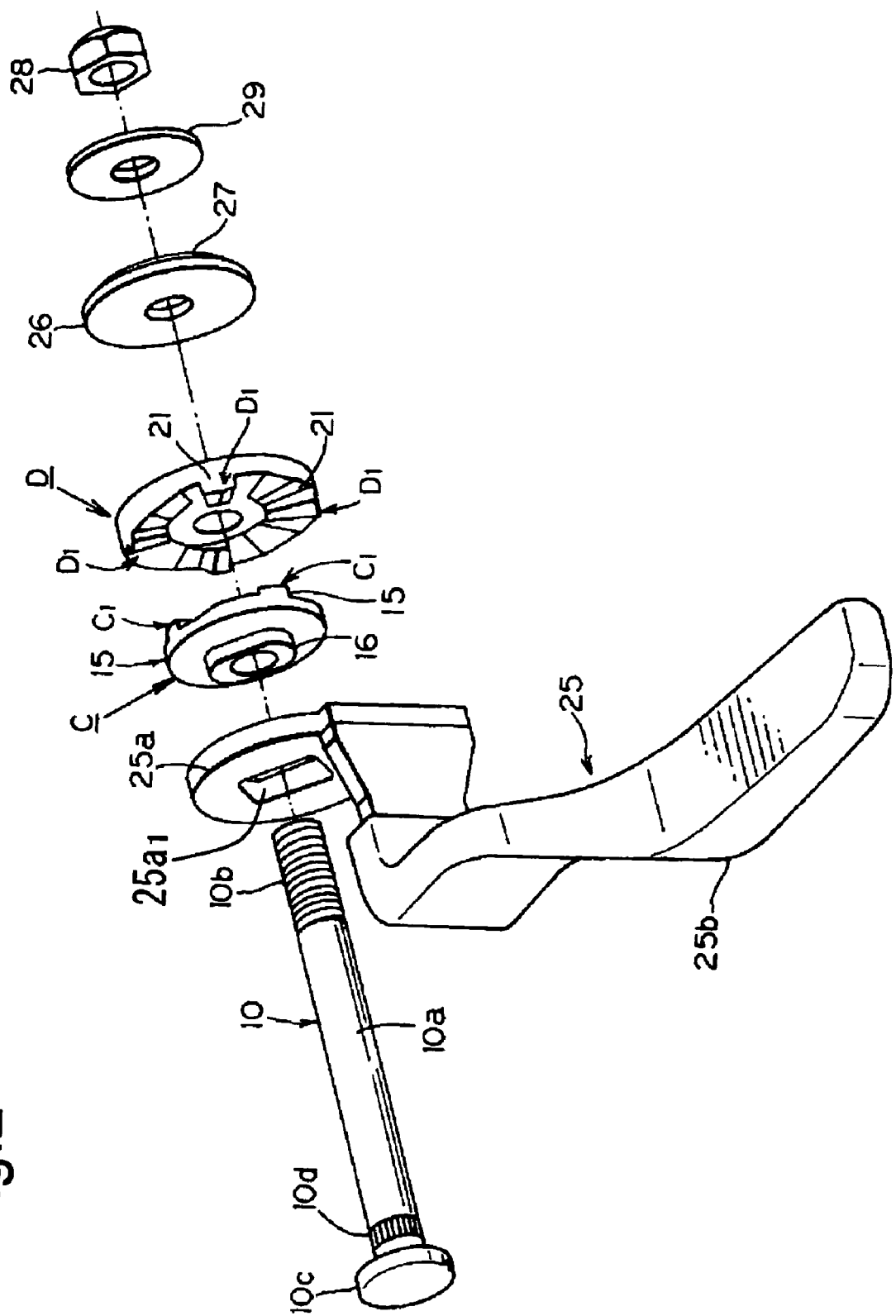
FIG. 2 is an exploded isometric view of the lock bolt, operation lever, main drive cam, driven cam, and other operation components.

Next, as shown in FIGS. 2 and 11, the lock bolt 10 includes a bolt shank 10a, a bolt threaded part 10b, and a bolt head 10c. The bolt threaded part 10b is formed at one end of the bolt shank 10a, and the bolt head 10c is formed at the other end of the bolt shank 10a. Also, in the bolt shank 10a at a position near the bolt head 10c a press fit area 10d is formed, that is press fitted into an insertion hole 11a in a main drive cam C described later, so that the main drive cam C rotates as the lock bolt 10 rotates in the direction of the periphery of the shank. The press fit area 10d is formed with a diameter slightly larger than the diameter of the bolt shank 10a, or knurls are formed in the approximate shape of splines.

Regarding the direction of forming the threads of the bolt threaded part 10b, with the main drive cam C which is described later and an operation lever 25 being fitted to the bolt threaded part 10b, it is desirable that the direction of forming the threads of the bolt threaded part 10b be determined so that when the operation lever 25 is rotated from below to above the tilt becomes locked. The two movable side parts 4, 4 of the movable bracket B are arranged between the two fixed side parts 1, 1 of the fixed bracket A, and the lock bolt 10 passes through the tilt adjustment elongated holes 1a, 1a of the two fixed side parts 1, 1 and the tilt adjustment through holes 4a, 4a of the movable bracket B. In this way, the lock bolt 10 can move vertically within the tilt adjustment elongated holes 1a, 1a, so the movable bracket B can move freely vertically relative to the fixed bracket A. The operation lever 25 is formed integrally with a rotation center part 25a and a lever part 25b as shown in FIG. 2. A fixing hole 25a, is formed in the rotation center part 25a, and the main drive cam C which is described later is inserted in the fixing hole $25a_1$.

Next, the main drive cam C and the driven cam D are explained. Firstly, as shown in FIGS. 1 through 7, the main drive cam C is formed from a cam base 11 on which a plurality of cam operation parts $C_1, C_1, \ldots$ are formed. As shown in FIGS. 3 and 4 and elsewhere, a low surface 12, a slanting surface 13, a high surface 14, and a cam projection 15 is continuously formed on each cam operation part $C_1$. Firstly, the cam base 11 is formed in a substantially circular plate shape. Also an insertion hole 11a is formed in the center of the cam base 11. The insertion hole 11a is a press fit with the press fit area 10d of the lock bolt 10, and as stated previously the main drive cam C can rotate together with the lock bolt 10 in the circumferential direction around the shank.

Figure 3A:
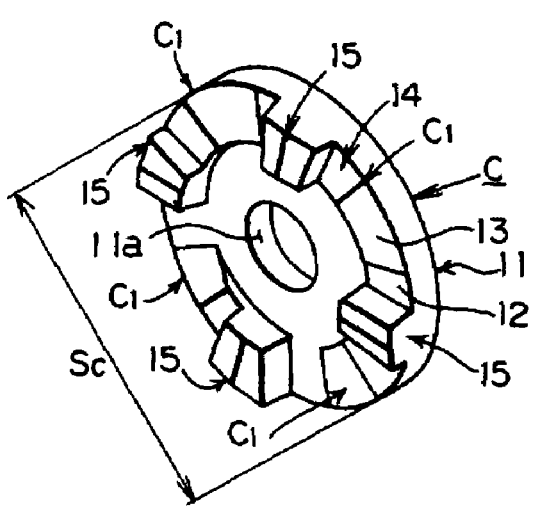
FIG. 3A is an isometric view of the main drive cam, 3B is an isometric view of the driven cam, 3C is an enlarged isometric part view showing a comparison of the size of the main drive cam (continuous line) and the driven cam (chain dotted line), 3D is an enlarged isometric view of a different part showing a comparison of the size of the main drive cam of 3A (continuous line) and the driven cam (chain dotted line)
Figure 3B:
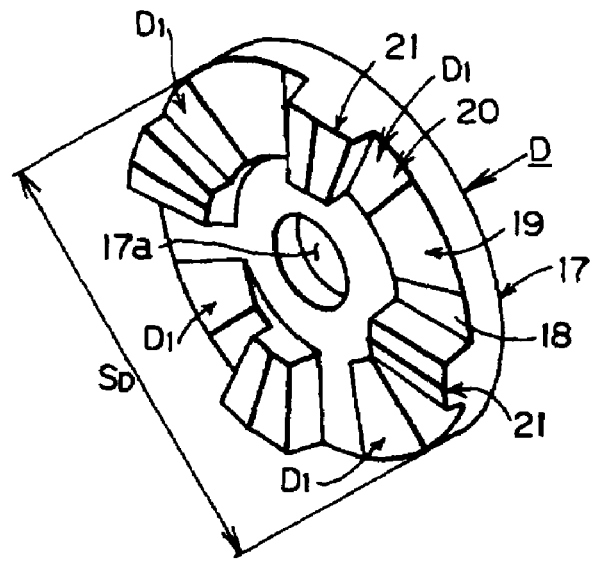
Figure 3C:
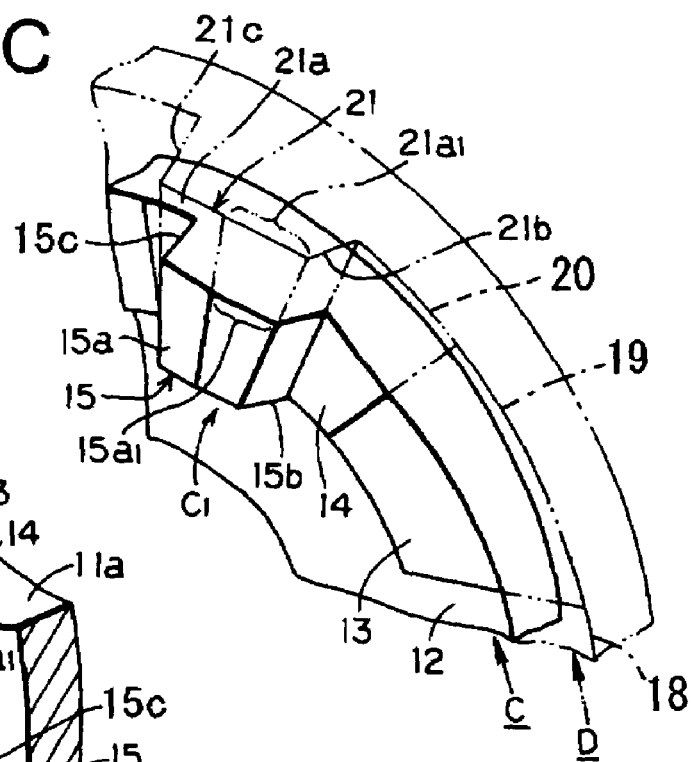
Figure 3D:
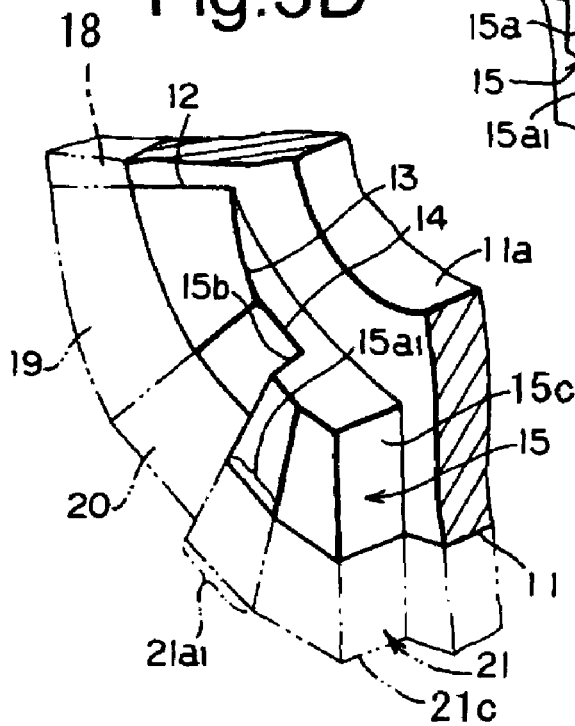
Figure 4A:
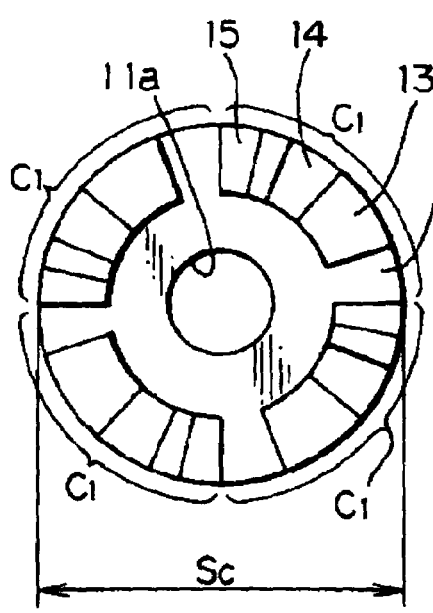
FIG. 4A is a front view of the main drive cam, 4B is a rear view of the main drive cam, 4C is a section view of 4A.
Figure 4B:
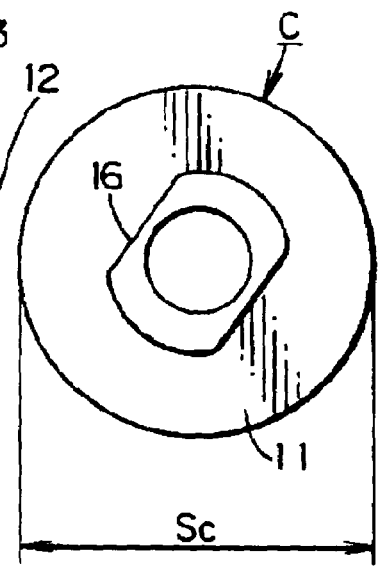

On one side of the cam base 11 and in a suitable area around the periphery a plurality of cam operation parts $C_1$ are formed. As stated previously, each cam operation part $C_1, C_1, \ldots$ has the low surface 12, the slanting surface 13, the high surface 14, and the cam projection 15, and the plurality of cam operation parts $C_1, C_1, \ldots$ is formed at equal intervals around the periphery of the cam base 11. Specifically, as shown in FIGS. 3A and 4A, the cam base 11 is divided into four equal parts, and in the area of each of these four equal parts one cam operation part $C_1$ is formed, so that there are four cam operation parts $C_1, C_1, \ldots$ formed on the cam base 11.

Also, all cam operation parts $C_1, C_1, \ldots$ formed on the cam base 11 have the low surface 12, the slanting surface 13, the high surface 14, and the cam projection 15. In other words, on a single cam operation part $C_1$ the low surface 12, the slanting surface 13, the high surface 14, and the cam projection 15 are arranged in that order.

As shown in FIGS. 3A, 3B, and 3C, and FIGS. 4A and 4B, the low surface 12 and the high surface 14 are formed as flat surfaces along the surface of the circular plate of the cam base 11. The low surface 12 is a cam surface formed at a low position, and serves a role when the main drive cam C and the driven cam D are in the close state. Also, the high surface 14 is a cam surface formed at a high position, and serves a role when the main drive cam C and the driven cam D are in the separated state. Here the close state of the main drive cam C and the driven cam D refers to the state where the main drive cam C and the driven cam D rotate relative to each other while maintaining contact, and as shown in FIGS. 8A, 9D, and 10C, the distance between them is a minimum at $T_{min}$. Also, the separated state of the main drive cam C and the driven cam D refers to the state where the main drive cam C and the driven cam D rotate relative to each other while maintaining contact, and as shown in FIGS. 8B, 9A, and 10A, the distance between them is a maximum at $T_{max}$. Also, the slanting surface 13 is formed between the low surface 12 and the high surface 14. Also, as shown in FIGS. 3A, 3B, and 3C, and FIGS. 4A and B, the shape of the cam projection 15 when viewing the perimeter side surface from outside is formed as an approximately rectangular shape, and includes a top surface 15a, a side rising from the high area 15b, and a side rising from the low area 15c.

In the cam projection 15, the side rising from the high area 15b is the side surface towards the high surface 14, and the side rising from the low area 15c is the side surface towards the low surface 12. In other words, the high surface 14 is located on one side of the cam projection 15 in the width direction (the direction along the perimeter of the cam base 11) and on the other side the low surface 12 is located. The side of the cam projection 15 in which the high surface 14 is located is called the side rising from the high area 15b, and the side of the cam projection 15 in which the low surface 12 is located is called the side rising from the low area 15c.

The side rising from the high area 15b and the side rising from the low area 15c of the cam projection 15 are surfaces sloping at an angle close to a right angle. Specifically, the side rising from the high area 15b and the side rising from the low area 15c slope so that they gradually approach the top surface 15a, and the shape of the cross-section that is normal to the radial direction of the cam projection 15 is an approximately trapezoidal shape (see FIGS. 3C and 3D, 7, 10, etc.). Also, the side rising from the high area 15b and the side rising from the low area 15c need not be at right angles to the top surface 15a.

In the top surface 15a of the cam projection 15, a guide surface $15a_1$ with a slight slope is formed towards the side rising from the high area 15b. The guide surface $15a_1$ is formed so that it slopes down towards the side rising from the high area 15b. The guide surface $15a_1$ is a flat sloping surface. A circular arc shaped surface may also be used. By forming the guide surface $15a_1$, the cam projection 15 can move smoothly when the cam projection 15 moves. Furthermore, the slope angle of the guide surface $15a_1$ can be made the same as the slope angle of the slanting surface 13. By making the slope of the guide surface $15a_1$ identical with that of the slanting surface 13, the area of contact of the cam projection 15 between the cam operation part $C_1$ of the main drive cam C and the driven cam D having an identically shaped cam operation part $D_1$ can be increased.

Figure 4C:
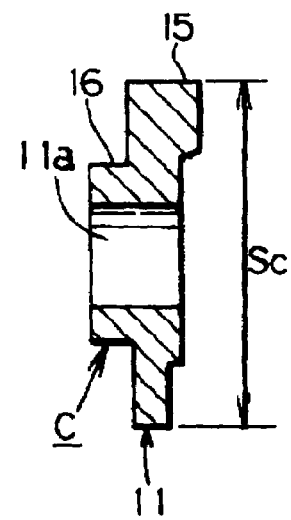

On the opposite side of the cam base 11 to the side on which the cam operation parts $C_1, C_1, \ldots$ are formed, a protrusion 16 that is non-circular shaped is formed concentric with the center of the cam base 11 as shown in FIGS. 2 and 4C. The protrusion 16 is formed in an oval, rectangular, or elliptical shape, or a circular shape that is flat in parts, or similar. The protrusion 16 is fitted so that it is inserted in the fixing hole $25a_1$ of the operation lever 25, so that the main drive cam C and the operation lever 25 rotate together. Therefore, the fixing hole $25a_1$ of the operation lever 25 is approximately the same shape as the protrusion 16, or is a hole shape that does not permit idling.

Figure 5A:
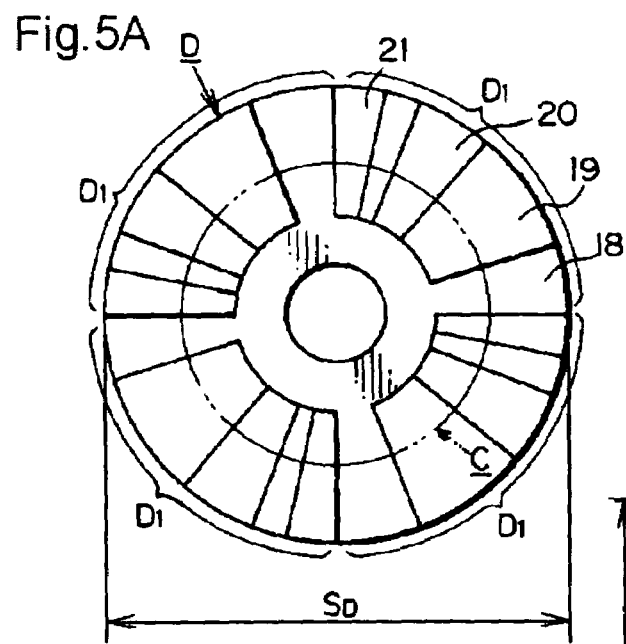
FIG. 5A is a front view of the driven cam, 5B is a rear view of the driven cam, 5C is a section view of 5A.
Figure 5B:
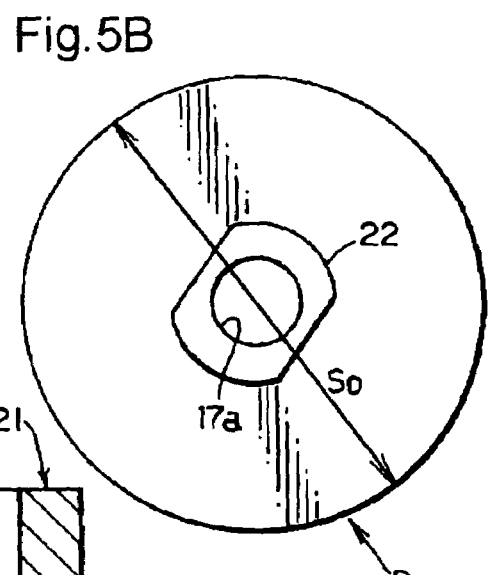
Figure 5C:
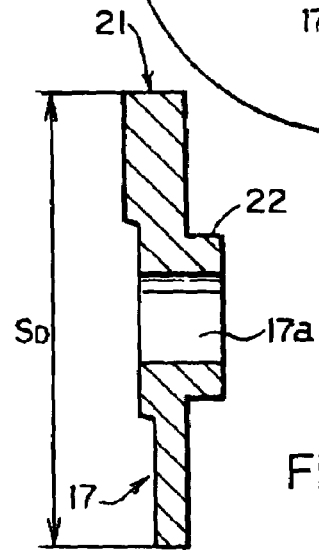

Next, the driven cam D is fitted to the position of the elongated hole for tilt adjustment 1a in the fixed side part 1 of the fixed bracket A. The driven cam D includes an approximately circular shaped cam base 17 on which a plurality of cam operation parts $D_1, D_1, \ldots$ are formed. The structure is approximately the same as the main drive cam C, but the diameter $S_D$ of the driven cam D is formed larger than the diameter $S_C$ of the main drive cam C, as shown in FIGS. 3 through 5. Specifically, the diameter $S_D$ of the cam base 17 of the driven cam D is formed larger than the diameter $S_C$ of the cam base 11 of the main drive cam C. In other words, (main drive cam C diameter $S_C$)<(driven cam D diameter $S_D$).

In fact, it is desirable to make the diameter $S_D$ of the driven cam D as large as possible, taking the size of the fixed bracket A into consideration. On the cam operation part $D_1$, a low surface 18, a slanting surface 19, a high surface 20, and a cam projection 21 are formed so as to be continuous. A fitting hole 17a is formed in the center of the cam base 17. The fitting hole 17a of the driven cam D is fitted so that idling is permitted relative to the bolt shank 10a of the lock bolt 10.

On one side of the cam base 17 and appropriately located along the perimeter in the circumferential direction, the plurality of cam operation parts $D_1, D_1, \ldots$ are formed. Each cam operation part $D_1$ includes the low surface 18, the slanting surface 19, the high surface 20, and the cam projection 21, and the plurality of cam operation parts $D_1, D_1, \ldots$ is formed at equal intervals around the periphery of the cam base 17. The low surface 18, the slanting surface 19, the high surface 20, and the cam projection 21 of the cam operation part $D_1$ are the same shape and size as the low surface 12, the slanting surface 13, the high surface 14, and the cam projection 15 of the main drive cam C, and they are formed under the same conditions.

Also, similar to the cam projection 15 of the main drive cam C, the cam projection 21 includes a top surface 21a, a side rising from the high area 21b, and a side rising from the low area 21c. The forming conditions and the shape of the top surface 21a, the side rising from the high area 21b, and the side rising from the low area 21c are the same as the top surface 15a, the side rising from the high area 15b, and the side rising from the low area 15c of the cam projection 15. Furthermore, in the top surface 21a of the cam projection 21 a guide surface $21a_1$ with a slight slope is formed towards the side rising from the high area 21b. This guide surface $21a_1$ is also formed to the same conditions as the guide surface $15a_1$ of the main drive cam C.

Therefore, the side rising from the high area 21b and the side rising from the low area 21c of the cam projection 21 are surfaces sloping almost at right angles, specifically the side rising from the high area 21b and the side rising from the low area 21c are shaped so that they gradually approach towards the top surface 21a (see FIGS. 3C and 3D and FIGS. 9A and 9B, etc.). Also, the side rising from the high area 21b and the side rising from the low area 21c may be at right angles to the top surface 21a.

Also, on the opposite side of the cam base 17 to the side on which the cam operation parts $D_1$, $D_1$, . . . are formed, a non-circular protrusion 22 is formed concentric with the center of the cam base 17. The protrusion 22 of the driven cam D is installed in the tilt adjustment elongated hole 1a in the side of the fixed bracket A so that the driven cam D cannot rotate. As stated previously, the diameter $S_D$ of the driven cam D is formed larger than the diameter $S_C$ of the main drive cam C.

Then, the side of the driven cam D opposite to the side on which the cam operation parts $D_1$, $D_1$, . . . are formed contacts the side of the fixed side part 1 of the fixed bracket A so that the protrusion 22 is inserted in the tilt adjustment elongated hole 1a. The side of the main drive cam C on which the cam operation parts $C_1$, are formed contacts the side of the driven cam D on which the cam operation parts $D_1$, are formed. However, the diameter $S_D$ of the driven cam D is larger than the diameter $S_C$ of the main drive cam C, so the area over which the driven cam D presses against the fixed side part 1 of the fixed bracket A can be larger than the area over which the main drive cam C presses against the driven cam D. Therefore, tilt and telescopic adjustments are complete, the state of fastening of the fixed bracket A to the movable bracket B can be stabilized (see FIGS. 6A and 6B).

Also, by increasing the diameter $S_D$ of the driven cam D, the fastening force is transmitted to the fixed bracket A over a wide area, and a large supporting force is obtained. Furthermore, compared with the case where the diameter $S_C$ of the main drive cam C is the same as the diameter $S_D$ of the driven cam D, the load to operate the operation lever 25 is smaller, so good operability can be obtained.

Next, the entire device is explained. First, as shown in FIGS. 1 and 11, the movable side parts 4, 4 of the movable bracket B are arranged between the fixed side parts 1, 1 of the fixed bracket A. Then, the position of the tilt adjustment elongated holes 1a, 1a formed in the fixed side parts 1, 1 are aligned so that they coincide with the tilt adjustment through holes 4a, 4a formed in the movable side parts 4, 4. The bolt shank 10a of the lock bolt 10 is set so that it passes through the tilt adjustment elongated holes 1a, 1a of the fixed side part 1, 1 and the tilt adjustment through holes 4a, 4a of the movable side parts 4, 4.

Here in FIG. 1, the assembled state of the fixed bracket A and the movable bracket B viewed from the driver's side (in other words, from the steering wheel 8 side), the bolt head 10c of the lock bolt 10 is set to be on the left hand side, and the bolt threaded part 10b is positioned on the right hand side. The structure of the bolt threaded part 10b extends from the tilt adjustment elongated hole 1a of the right hand fixed side part 1 and projects beyond the outside of the fixed bracket A. Also, in the tilt adjustment elongated hole 1a of the fixed side part 1 on the left hand side of the fixed bracket A when viewed by the driver, the driven cam D is fitted so that it cannot rotate. At this time the protrusion 22 of the driven cam D is inserted in the tilt adjustment elongated hole 1a, so the driven cam D is set so that it cannot rotate relative to the fixed bracket A.

Figure 7A:
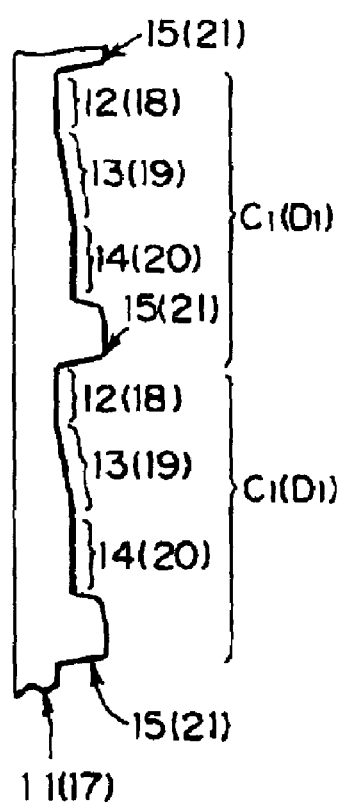
FIG. 7A is a developed view seen from the external perimeter side of the cam operation part of the main drive cam (driven cam), 7B is an enlarged view of part of 7A.

Furthermore, the bolt threaded part 10b of the lock bolt 10 passes through the fitting hole 17a of the driven cam D with clearance. The main drive cam C is fixed by press fitting on the press fit area 10d of the lock bolt 10. Furthermore, the operation lever 25 is fitted to the main drive cam C, so by rotational operation of the operation lever 25, the main drive cam C can rotate the lock bolt 10 in the circumferential direction. By appropriately fitting the lock bolt 10 into the fixed bracket A and the movable bracket B, the side of the main drive cam C on which the cam operation parts $C_1$, $C_1$, . . . are formed and the side of the driven cam D on which the cam operation parts $D_1$, $D_1$, . . . are formed are brought into confrontation, as shown in FIGS. 1, 2, and 7. In other words, each cam operation part $C_1$, and cam operation part $D_1$ overlap and contact with each other.

Also, at the other end of the lock bolt 10 from the bolt head 10c, a washer 26, a thrust bearing 27, a thrust washer 29, and a lock nut 28 are arranged from the fixed side part 1 of the fixed bracket A, as shown in FIGS. 1 and 11, fastened so that the lock bolt 10 can rotate freely relative to the fixed bracket A and the movable bracket B. Hence the operation lever 25, the lock bolt 10, and the main drive cam C are configured to rotate together. Also, on the bracket side of the lock nut 28, the thrust bearing 27 and the thrust washer 29 are provided so to prevent loosening by frictional engagement of the lock nut. The thrust washer 29 and the thrust bearing 27 rotate about the line of the axis as the lock bolt rotates.

Figure 12A:
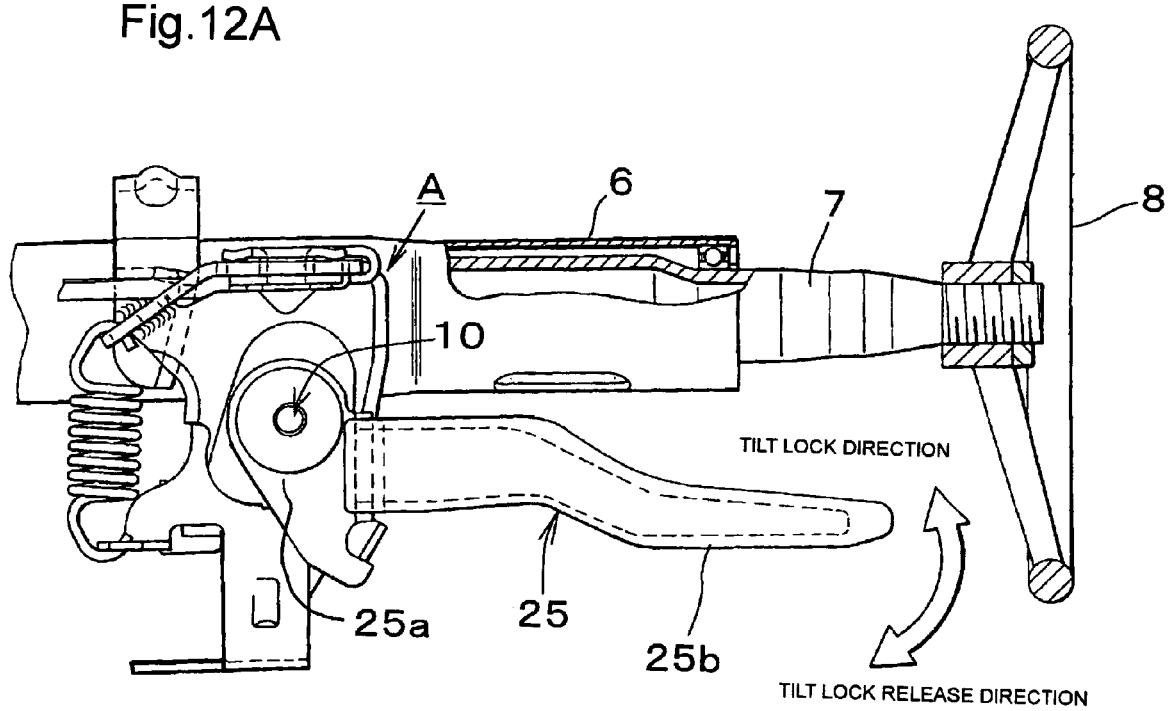
FIG. 12 is a side view partially sectioned of a steering device provided with the present invention.
Figure 13A:
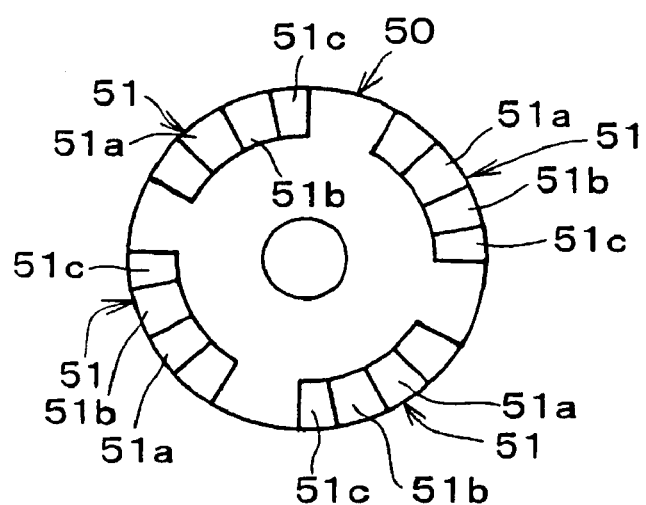
FIG. 13A is a plan view of a conventional type of main drive cam, 13B is a plan view of a conventional type of driven cam, and 13C is a simplified view showing the can operation of a conventional type.
Figure 13B:
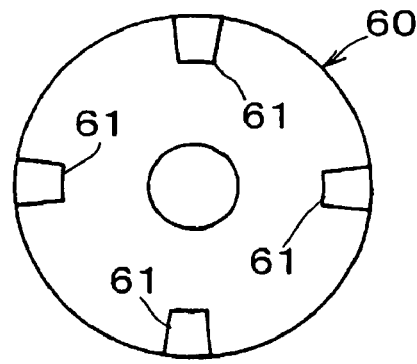
Figure 13C:
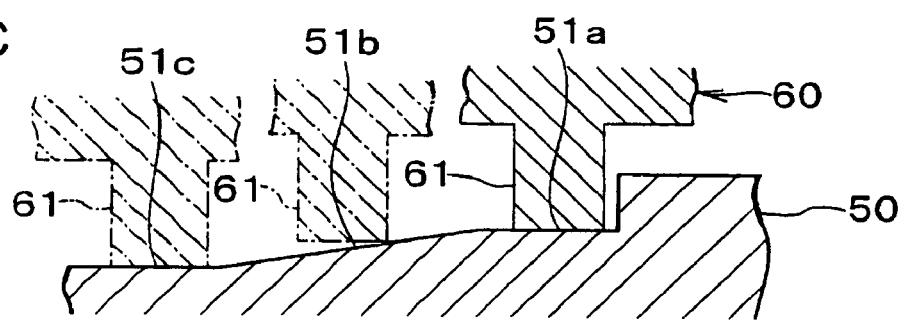

When the operation lever 25 is raised from below to above in FIG. 12, in other words rotated in the counterclockwise direction, the main drive cam C rotates together with the lock bolt 10 (the driven cam D is fixed) due to the rotation of the lock bolt 10 in the circumferential direction. Therefore, the main drive cam C rotates relative to the driven cam D, and as a result the cam operation parts $C_1$, $C_1$, . . . and the cam operation parts $D_1$, $D_1$, . . . move relative to each other.

The following is an explanation of the process of passing from tilt lock release to the tilt lock state, in this mutual rotational movement of the main drive cam C and the driven cam D. Between the cam operation part $C_1$ and the cam operation part $D_1$, the top part 15a of the cam projection 15 of the cam operation part $C_1$ passes from a position at the low surface 18 of the cam operation part $D_1$ through the slanting surface 19 to reach a position on the high surface 20, so that the main drive cam C and the driven cam D are separated. Also, at this time the top surface 21a of the cam projection 21 of the cam operation parts $D_1$ passes from a position at the low surface 12 of the cam operation part $C_1$ through the slanting surface 13 to reach a position on the high surface 14.

Figure 7B:
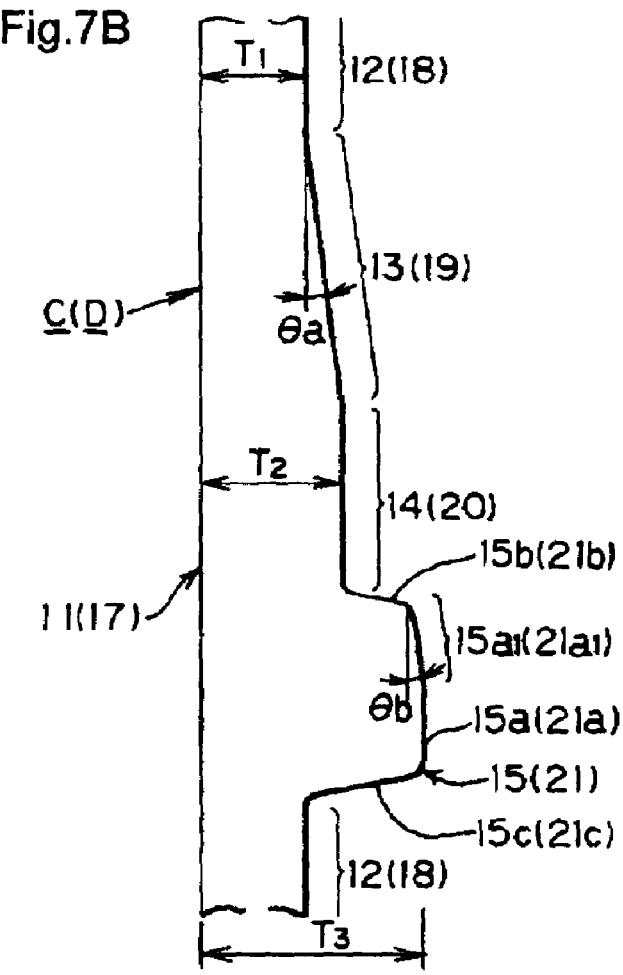

At this time, if the guide surface $15a_1$ of the cam projection 15 has the same sloping surface as the slanting surface 19, the guide surface $15a_1$ is always in plane contact with the slanting surface 19, so the cam projection 15 can move over the slanting surface 19 in a stable manner. Also, the relationship between the guide surface $21a_1$ of the cam projection 21 and the slanting surface 13 is the same. In other words, as shown in FIG. 7B, the angle of slope θb of the guide surface $15a_1$, ($21a_1$) is the same as the angle of slope θa of the slanting surface 19 (13), (in other words, θa=θb). Therefore, when the cam projection 15 (21) is moving over the slanting surface 19 (13), the guide surface $15a_1$, $(21a_1)$ is in plane contact with the slanting surface 19 (13) as shown in FIG. 10C. Therefore the area of contact of the cam projection 15 (21) and the slanting surface 19 (13) can be increased. Also, it is desirable that the guide surface $15a_1$, $(21a_1)$ be about half the area of the top surface 15a (21a) when viewed from the outer perimeter surface.

In other words, the top surface 15a of the cam projection 15 of the cam operation part $C_1$ and the top surface 21a of the cam projection 21 of the cam operation part $D_1$ are maintained to be always in contact with the corresponding cam operation part $C1$, $D_1$. In this way, by separating the main drive cam C and the driven cam D along the axis of the lock bolt 10, the fixed side parts 1, 1 of the fixed bracket A and the movable side parts 4, 4 of the movable bracket B mutually press against each other to create the tilt lock state.

At this time, if the thickness of the main drive cam C (including also the driven cam D) at the position of the low surface 12 (low surface 18) is $T_1$, the thickness at the position of the high surface 14 (high surface 20) is $T_2$, and the thickness at the position of the cam projection 15 (cam projection 21) is $T_3$, when the main drive cam C and the driven cam D are separated, the separation overall thickness $T_a=T_3+T_2$. This is the maximum separation $T_{max}$ of the main drive cam C and the driven cam D. Also, when the main drive cam C and the driven cam D are in the close state, the close overall thickness $T_b=T_3+T_1$. This is the minimum separation $T_{min}$ of the main drive cam C and the driven cam D. Therefore, the difference in separation of the main drive cam C and the driven cam D when they are in the separated state and in the close state T=maximum separation $T_{max}$–minimum separation $T_{min}=T_a-T_b=T_2-T_1$. This separation difference T is the amount of tightening of the movable bracket B to the fixed bracket A due to the cam.

Next, the process of changing from the tilt lock state to the tilt lock release state is explained. By rotating the operation lever 25 from above to below, in other words clockwise, the main drive cam C rotates in the opposite direction to previously. In the mutual rotation movement of the main drive cam C and the driven cam D, between the cam operation part $C_1$ and the cam operation part $D_1$, the top surface 15a of the cam projection 15 of the cam operation part $C_1$ passes from a position on the high surface 20 of the cam operation part $D_1$ through the slanting surface 19 to reach a position on the low surface 18, so that the main drive cam C and the driven cam D are in the close state.

Also, at this time the top surface 21a of the cam projection 21 of the cam operation part $D_1$ passes from a position on the high surface 14 of the cam operation part $C_1$ through the slanting surface 13 to reach a position on the low surface 12. Hence the top surface 15a of the cam projection 15 of the cam operation part $C_1$ and the top surface 21a of the cam projection 21 of the cam operation part $D_1$ always maintain contact with the respective cam operation part $C_1$, $D_1$. In this way, the main drive cam C and the driven cam D come into the close state along the axial direction of the lock bolt 10, so the fixed side parts 1, 1 of the fixed bracket A and the movable side parts 4, 4 of the movable bracket B become mutually loose, and the tilt lock state is released. The movable bracket B can tilt and telescope relative to the fixed bracket A.

In the overlap state of the plurality of cam operation parts $C_1$, $C_1$, . . . (in the above embodiment there are four) of the main drive cam C and the plurality of cam operation parts $D_1$, $D_1$, . . . (in the above embodiment there are four) of the driven cam D, the timing of the movements of each cam projection 15, 15, . . . and cam projection 21, 21, . . . are all the same. As shown in FIGS. 9A through 9D and FIGS. 10A and 10B, the top surfaces 15a, 15a . . . of the cam projections 15, 15 . . . and the top surfaces 21a, 21a . . . of the cam projections 21, 21 . . . are in mutual contact with the corresponding cam operation parts $C_1$, $C_1$, . . . and cam operation parts $D_1$, $D_1$, . . . . Also, FIGS. 9A through 9D in that order show the process of moving gradually from the separated state to the close state when the main drive cam C rotates relative to the driven cam D. FIG. 10 is an enlarged view showing the mutual movement of the cam projection 15 with the cam projection 21 shown in FIG. 9.

Also, in the mutual rotation movement in tilt locking and releasing by the main drive cam C and the driven cam D, in each rotation movement the cam projection 15 of the cam operation part $C_1$ and the cam projection 21 of the cam operation part $D_1$ are in contact. Therefore they act as mutual stoppers, so it is possible to accurately control the tilt lock position and the release position. In this way stable performance can be achieved with a low cost configuration.

According to the above configuration, the cam projections 15, 15, . . . of the cam operation parts $C_1$, $C_1$, . . . of the main drive cam C and the cam projections 21, 21, . . . of the cam operation parts $D_1$, $D_1$, . . . of the driven cam D move while always contacting the low surface 12, the slanting surface 13, the high surface 14 or the low surface 18, the slanting surface 19, the high surface 20 when the operation lever 25 is operated. Therefore compared with a conventional type cam mechanism in which a cam projection is provided on one side only and the other side is provided with a cam surface that contacts the cam projection, the number of mutually contacting surfaces is doubled, so the contact pressure is distributed among the contact locations.

In the present invention, the cam projections 15, 21 of the main drive cam C and the driven cam D come into contact with each other along the cam axial rotation direction (or the circumferential direction). The cam projections 15, 21 are in confrontation with each other in the axial direction, but the top surfaces 15a, 21a do not come into contact. Also, in the process of changing from the tilt lock state formed between the main drive cam C and the driven cam D to the tilt lock release state therebetween and the reverse process, the cam projection 15 and the cam projection 21 always maintain the state of contact (surface contact) with the cam operation part $C_1$, $D_1$ of the corresponding cam (main drive cam C, driven cam D).

As a result of this, compared with a conventional type, the pressure applied to a single cam projection 15 or cam projection 21 is half, so wear of the cam projection 15 and cam projection 21 is low over a long period, and it is possible to prevent damage to the cam surfaces, so the durability of the tilt and telescopic steering device can be improved.

Furthermore, in the present invention the diameter $S_D$ of the driven cam D is larger than the diameter $S_C$ of the main drive cam C and the area of contact of both the cam operation part $D_1$ of the driven cam D and the cam operation part $C_1$ of the main drive cam C are approximately equal and the same shape. Therefore, without increasing the rotation load of the operation lever 25, because the contact surface between the driven cam D and the fixed bracket A is broad, the pressure applied by the driven cam D on the fixed bracket A is applied over a wide area, so a large retention force can be obtained, so the tilt lock state is stable. Furthermore, interlocking of the main drive cam C and the driven cam D is smooth, so the operability can be very good (see FIGS. 6A, 6B).

What is claimed is:

1. A fixing device for a steering device, comprising:
a fixed bracket comprising a fixed side part;
a movable bracket comprising a movable side part;
a lock bolt that passes through the fixed side part and the movable side part;
a main drive cam, through which the lock bolt passes;
a driven cam, through which the lock bolt passes, unrotatably fitted to the fixed bracket; and
an operation lever that rotates the main drive cam,
wherein a plurality of cam operation parts, each comprising a low surface, a slanting surface, a high level surface, and a cam projection, mutually of the same shape, are formed on the main drive cam and the driven cam respectively,
wherein the main drive cam and the driven cam separate when the cam projection of the main drive cam reaches the high level surface of the driven cam, and the cam projection of the driven cam reaches the high level surface of the main drive cam,
wherein the main drive cam approaches the driven cam when the cam projection of the main drive cam reaches the low level surface of the driven cam, and the cam projection of the driven cam reaches the low level surface of the main drive cam,
wherein the cam projection of the main drive cam and the cam projection of the driven cam mutually maintain contact with at least one of the low level surface, the slanting surface, and the high level surface of the cam operation part thereof on an opposite side during rotation of the main drive cam, and
wherein a diameter of the driven cam is greater than a diameter of the main drive cam.

2. The fixing device for a steering device according to claim 1, wherein a guide surface that slopes towards a side of the high surface is formed on a top surface of the cam projection.

3. The fixing device for a steering device according to claim 2, wherein the guide surface comprises the same slope as a slope of the slanting surface.

4. The fixing device for a steering device according to claim 2, wherein the guide surface comprises substantially one-half of the top surface of the cam projection.

5. The fixing device for a steering device according to claim 1, wherein, if the main drive cam approaches the driven cam, the main drive cam contacts the driven cam.

6. The fixing device for a steering device according to claim 1, wherein, if the main drive cam and the driven cam separate, the main drive cam contacts the driven cam.

7. The fixing device for a steering device according to claim 1, wherein the low surface, the slanting surface, the high level surface, and the cam projection comprise a continuous surface.

8. The fixing device for a steering device according to claim 1, wherein a size of the low surface, a size of the slanting surface, a size of the high level surface, and a size of the cam projection of the main drive cam are substantially equal to a size of the low surface, a size of the slanting surface, a size of the high level surface, and a size of the cam projection of the driven cam, respectively.

9. The fixing device for a steering device according to claim 1, wherein a number of cam operation parts in the main drive cam is equal to a number of cam operation parts in the driven cam.

* * * * *